(12) United States Patent
Bartas (10) Patent No.: US 6,377,999 B1
(45) Date of Patent: Apr. 23, 2002

(54) FIRMWARE AND SOFTWARE PROTOCOL PARSER

(75) Inventor: John Alexander Bartas, Cupertino, CA (US)

(73) Assignee: Interniche Technologies Inc., San Jose, CA (US)

( * ) Notice: Subject to any disclaimer, the term of this patent is extended or adjusted under 35 U.S.C. 154(b) by 0 days.

(21) Appl. No.: 09/309,207

(22) Filed: May 10, 1999

(51) Int. Cl.[7] .............................................. G06F 15/16
(52) U.S. Cl. ...................... 709/236; 709/236; 709/313; 710/22; 710/24; 710/26; 711/4; 711/200; 711/217; 711/220; 712/230; 717/5
(58) Field of Search ................................ 709/231, 236, 709/313; 717/5; 712/230; 711/217, 220, 200, 4; 710/24, 26, 22

(56) References Cited

U.S. PATENT DOCUMENTS

| | | | | | |
|---|---|---|---|---|---|
| 5,237,593 | A | * | 8/1993 | Fisher et al. ................. | 345/115 |
| 5,594,919 | A | * | 1/1997 | Turkowski ................... | 395/800 |
| 5,765,216 | A | * | 6/1998 | Weng et al. ................. | 711/214 |
| 6,119,263 | A | * | 9/2000 | Mowbray et al. ........... | 714/781 |

* cited by examiner

Primary Examiner—Robert B. Harrell
Assistant Examiner—Farzaneh Farahi
(74) Attorney, Agent, or Firm—H. Black P.E.

(57) ABSTRACT

An improved method and computer to parse a data stream comprising a series of command strings is disclosed. The method provides superior performance in terms of balance between processor cycle usage, memory usage and portability across platforms.

5 Claims, 7 Drawing Sheets

```
static u_long htmlcode(char * input, char termchar)
{
u_long code = 0; /* return code */ int bytes = 0;       /* bytes read from input */ u_char chr;

/* stop encoding if it's termination char or space */
     while(*input != termchar && *input != ' ')
     {
          code <<= 8;     /* shift return value up one byte */
          chr = *(u_char*)input++;
          if(chr >= 'A' && chr <= 'Z')    /* if uppercase char... */
               chr |= 0x20;     /* make lowercased char */
          code |= (u_long)chr;  /* or in char */
          if(++bytes == 4) /* only do max of 4 bytes */
               return code;
     }
     while(bytes++ < 4)    /* padd with zeros to 4 bytes */
     {
          code <<= 8;
          code &= 0xFFFFFF00;
     } return code;
}
```

```
int    FontFunc1(char*);
int    BoldFunc(char*);
int    ItalFunc(char*);

int (*ServiceFunction[])(char*) =
{
   FontFunc1,
   BoldFunc,
   ItalFunc,
};

define NUMBEROFSERVICEFUNCTIONS 3 char * ServiceStringTable[] = {
   "FONT",
   "BOLD",
   "ITALICS",
};

int
ServiceString(char * bufferaddress)
{
int i;

for(i = 0; i < NUMBEROFSERVICEFUNCTIONS; i++)
   {
      if(strcmp(bufferaddress, ServiceStringTable[i])
== 0)
      {
         return(ServiceFunction[i](bufferaddress));
      }
   }
}
```

Figure 1 (Prior Art)

```
int  FontFunc1(char*);
int  BoldFunc(char*);
int  ItalFunc(char*);

int  ServiceString(char * bufferaddress)
{
int return_code;

switch(*bufferaddress)
  {
  case 'F':
  case 'f':
    switch(*(bufferaddress+1))
      {
        case 'O':
        case 'o':
        return_code = FontFunc(bufferaddress);
        break;
      }
    break;
  case 'B':
  case 'b':
    switch(*(bufferaddress+1))
      {
        case 'O':
        case 'o':
        return_code = BoldFunc(bufferaddress);
        break;
      }
    break;
  case 'I':
  case 'i':
    switch(*(bufferaddress-1))
      {
        case 'T':
        case 't':
        return_code = ItalFunc(bufferaddress);
        break;
      }
    break;
  default:
    /* unhandled string */
    break;
  }
  return(return_code);
}
```

```
static u_long htmlcode(char * input, char termchar)

{ u_long code = 0; /* return code */ int bytes = 0;         /* bytes read from input */ u_char chr;

/* stop encoding if it's termination char or space */
    while(*input != termchar && *input != ' ')
    {
        code <<= 8;      /* shift return value up one byte */
        chr = *(u_char*)input++;
        if(chr >= 'A' && chr <= 'Z')      /* if uppercase char... */
            chr |= 0x20;    /* make lowercased char */
        code |= (u_long)chr;  /* or in char */
        if(++bytes == 4) /* only do max of 4 bytes */
            return code;
    }
    while(bytes++ < 4)    /* padd with zeros to 4 bytes */
    {
        code <<= 8;
        code &= 0xFFFFFF00;
    } return code;
}
```

Figure 4

```
        /* fall to here if we got an HTML tag */
        cp2 = strchr(cp, '>');
        if(!cp2 || (cp2 > (cp + htmllen)))   /* close of tag is not in
buffer */
            return htmllen;

taglen = (cp2 - cp) + 1;      /* figure size of this tag */
        code = htmlcode(cp+1, '>');   /* get the guts of the tag */
        switch (code)
        {
        case 0x70000000:  /* <p> */
           BrPutline(frame, 1);    /* flush previous line buffer */
              frame->trec->text_y -= (frame->trec->char_height/2);     /*
extra horz. space */
              BrSetAlign(&frame->attribute, cp, taglen);  /* set new
alignment */
              break;
          case 0x62720000:  /* <br> - do a linefeed */
       case 0x64640000:       /* <DD>   */
       case 0x2F646400:       /* </DD>  */
           BrPutline(frame, 1);    /* flush whole line buffer */
              break;
          case 0x2F700000:  /* </P> */
       case 0x2F63656E:       /* </center> */
           BrPutline(frame, 0);    /* flush text with existing attribute
*/
              frame->attribute &= ~BT_ALIGNMASK;  /* restore defaults */
              break;
       case 0x63656E74:       /* <center> */
           BrPutline(frame, 0);    /* flush text with existing attribute
*/
           frame->attribute |= BT_CENTER;
           break;
         case 0x62000000:  /* <b> */
           BrPutline(frame, 0);    /* flush text with existing attribute
*/
              frame->attribute |= BT_BOLD;
              break;
          case 0x2F620000:  /* </b> */
           BrPutline(frame, 0);    /* flush text with existing attribute
*/
              frame->attribute &= ~BT_BOLD;
              break;
       case 0x68656164:      /* <head> */
           frame->state |= ST_INHEAD;
           break;
       case 0x2f686561:
           frame->state &= ~ST_INHEAD;
           break;
       case 0x61000000:       /* <A ... */
           BrPutline(frame, 0);    /* flush text with existing attribute
*/
```

Figure 5A

```
          BrSetTextPos(frame);    /* set x/y for start of link */
          if((thislink = MkNewLink(cp, taglen, frame)) == NULL)
              break;
          frame->attribute |= BT_LINK;
          /* set x/y of link rect - height/width is set after we print
</A> */
          BrSetTextPos(frame);    /* set x/y for start of link text */
          thislink->rect.x_pos = frame->trec->text_x;
          thislink->rect.y_pos = frame->trec->text_y;
          break;
      case 0x2f610000:    /* </A ... */
          BrPutline(frame, 0);    /* flush text with link attribute */
          BrSetTextPos(frame);    /* set x/y for end of link */
          CloseLink(frame);       /* close current link */
          frame->attribute &= ~BT_LINK;
          thislink = NULL;
          break;
      case 0x646C0000:    /* <DL - a list - set indentation value */
          BrPutline(frame, 1);    /* flush line prior to indenting */
          indent = frame->state & ST_INDENTMASK;
          if(indent < ST_INDENTMASK)
              indent++;
          frame->state &= !ST_INDENTMASK;
          frame->state |= indent;
          break;
      case 0x2F646C00:    /* </DL */
          BrPutline(frame, 1);    /* flush line prior un-indenting */
          indent = frame->state & ST_INDENTMASK;
          if(indent > 0)
              indent--;
          frame->state &= !ST_INDENTMASK;
          frame->state |= indent;
          break;
      case 0x6672616D:    /* <FRAM... - frameset or frame */
          if(stristr(cp, "<FRAMESET"))
          {
              taglen = MkFrames(frame, cp, htmllen);
              if(taglen == 0) /* MkFrames needs more buffer data */
                  return htmllen;
          }
          else    /* should have been processed in MkFrames */
          {dtrap(); } /* should never happen - bad code or HTML? */
          break;
      case 0x2F667261:    /* </FRA... - end of frameset */
      case 0x2F6D6170:    /* </MAP... - end of MAP */
          dtrap();    /* these should have been parsed by tag openers */
          break;
      case 0x696D6700:    /* <IMG ... */
          MkImage(frame, cp, taglen);
          break;
      case 0x74000000:    /* <T> - our own TAB extension */
          BrPutline(frame, 0);    /* flush line prior to TAB */
```

Figure 5B

```
          if(frame->trec->text_x < 64)
              frame->trec->text_x  = 64;
          else
              frame->trec->text_x = frame->trec->rect.x_pos + (frame-
  >trec->rect.width/2);
          break;
      case 0x6D617000:    /* <MAP - image map file spec. */
          taglen = MkImageMap(frame, cp, htmllen);
          if(taglen == 0)
              return htmllen;
          break;
       case 0x7461626C:   /* <TABLE> */
              BrPutline(frame, 1);    /* flush text & end paragraph */
              if(StartTable(frame, cp, htmllen))
                  return htmllen;
              break;
      case 0x2F746162:    /* </TABLE ... */
              EndTable(frame);
              break;
      case 0x74720000:    /* <TR> */
              BrTableTR(frame->tables, cp, taglen);
              break;
        case 0x2F747200:  /* </TR> */
              BrEndTR(frame->tables);
              break;
      case 0x74640000:    /* <TD> */
          frame->state |= ST_INCELL;
              BrTableTD(frame->tables, cp, taglen);
              break;
        case 0x2F746400:  /* </TD> */
              BrEndTD(frame->tables);
          frame->state &= ~ST_INCELL;
              break;
      case 0x2F68746D:    /* </HTML> - end of page */
          BrPutline(frame, 0);    /* final flush of line buffer */
          break;
      default:    /* unknown or unsupported tag */
              break;
      }
      htmllen -= taglen;
      cp += taglen;
      goto newtag;

FIRMWARE AND SOFTWARE PROTOCOL PARSER

BACKGROUND OF THE INVENTION

1. Field of the Invention

The invention generally relates to command string interpreter usage implemented in firmware and/or software. The invention more particularly relates to embeddable interpreters for hypertext transfer protocol (HTTP) and hypertext markup language (HTML) interpreters used in networked environments. Relevant networked environments include, inter-alia, the Internet.

2. Description of the Related Art

A plethora of information is now readily available to computer users. Online services and networks, especially the Internet, and in particular the World Wide Web (WWW) implemented thereon, make a large amount of information accessible to almost any personal computer. connected to the Internet.

The widely used layout language for a WWW document is Hypertext Markup Language (HTML). HTML exists in several versions, or revision levels, and extensions providing session level features such as encryption are available (SHTML, PHTML, etc.).

WWW documents are typically given a "Uniform Resource Locator" (URL). An URL is essentially a protocol selector together with an address path identifying the server computer that hosts the desired document, also together with the location of the document on the server's file-system (also known as "filestore"). Using browser software such as NETSCAPE® NAVIGATOR®, a person can send a request from a client computer to access a document stored at a server referenced by a URL. When the server receives the client's request, the server sends a representation of the data in the requested HTML WWW document to the client computer wherein a representation of the document can be displayed upon a Cathode Ray Tube (CRT).

A session protocol known as "Hypertext Transfer Protocol" (HTTP) is typically used in making a request for a WWW document and in transferring representations of WWW documents. Servers that maintain HTML Web documents are commonly known as "Web Sites". For more background information about WWW, see for example T. Berners-Lee, et al. "The World Wide Web," Communications of the ACM, vol. 37 (8), August 1994.

One of the design aims of HTML is that information about data structure is transferred, but the finer details of data presentation are a matter for the client software to decide. In principle, the client software could (for example) translate the document into a foreign language or a different typeface. A common client (browser) presentation feature is to vary the color of the displayed representation of hypertext links present within the HTML according to whether the further referenced document is, or is not, cached. By convention, blue is the preferred color for a non-cached hyperlink. Linking using hypertext links is well known in the WWW arts. Presentation software in a client can perform many things, for example if the display is limited in capability (e.g. a limited size LCD (liquid crystal display) then adjustments to optimize presentation are possible.

The widespread adoption of the WWW, especially by those who use personal computers has lead to a great proliferation in server software and expertise in the creation, manipulation and use thereof. Hence, it is unremarkable that this has in turn lead to extensive re-use of the relevant system programs. In particular, Internet Protocol (IP), HTTP, and HTML have all found use in the world of dedicated and embedded systems (in addition to the more obvious usage in personal computers (PCs)).

There is also a trend towards incorporation of specialized Internet access into devices that are not dedicated computers. Such appliances might include domestic appliances (e.g. refrigerators, washing machines and various cooking devices), terminals in public places such as airports, display devices in motor vehicles and so forth.

Embedded computers are paradigmatically used as part of dedicated equipment in relatively stable applications. Such equipment is often capable of unattended operation, and the relative lack of need for flexibility (as compared with PCs) provides a beneficial opportunity to pare costs and improve performance by eschewing features.

As intimated above, costs are an important factor in embedded systems, especially as such systems are commonly sold as a bundled package. Moreover, many embedded systems also have a SCADA (Supervision, Control And Data Acquisition) aspect or instrumentation aspect and thus a have need for high-performance real-time capabilities. Thus, it is desirable in those embedded systems that incorporate browsers (or other HTML etc. interpreters) to use Microprocessors (MPUs or, sometimes CPUs) that offer high computing power at low prices. Such MPUs are typically modish and popular consumer units, and (at the present time) usually have a 32-bit architecture. However, the pace of MPU development is hot and the market for MPUs is dynamic so it is important that any software and/or firmware code used be portable across architectures. Thus, the MPUs may be selected according to whichever provides the prevailing optimal price/performance tradeoff. In particular small-endian CPU architectures (as typified by INTEL® products) vie for price performance advantage with large-endian architectures such as Power PC® products from IBM® and MOTOROLA®. Large-endian and small-endian architectures are well known in the relevant arts.

Implementing computer code for portability typically conflicts with implementing for run-time performance, and the prior practice of handcrafting optimized instruction codes is thought to be too burdensome nowadays. This is especially so as compared to the excellent results of which modern optimizing compilers are capable.

Figure 1:
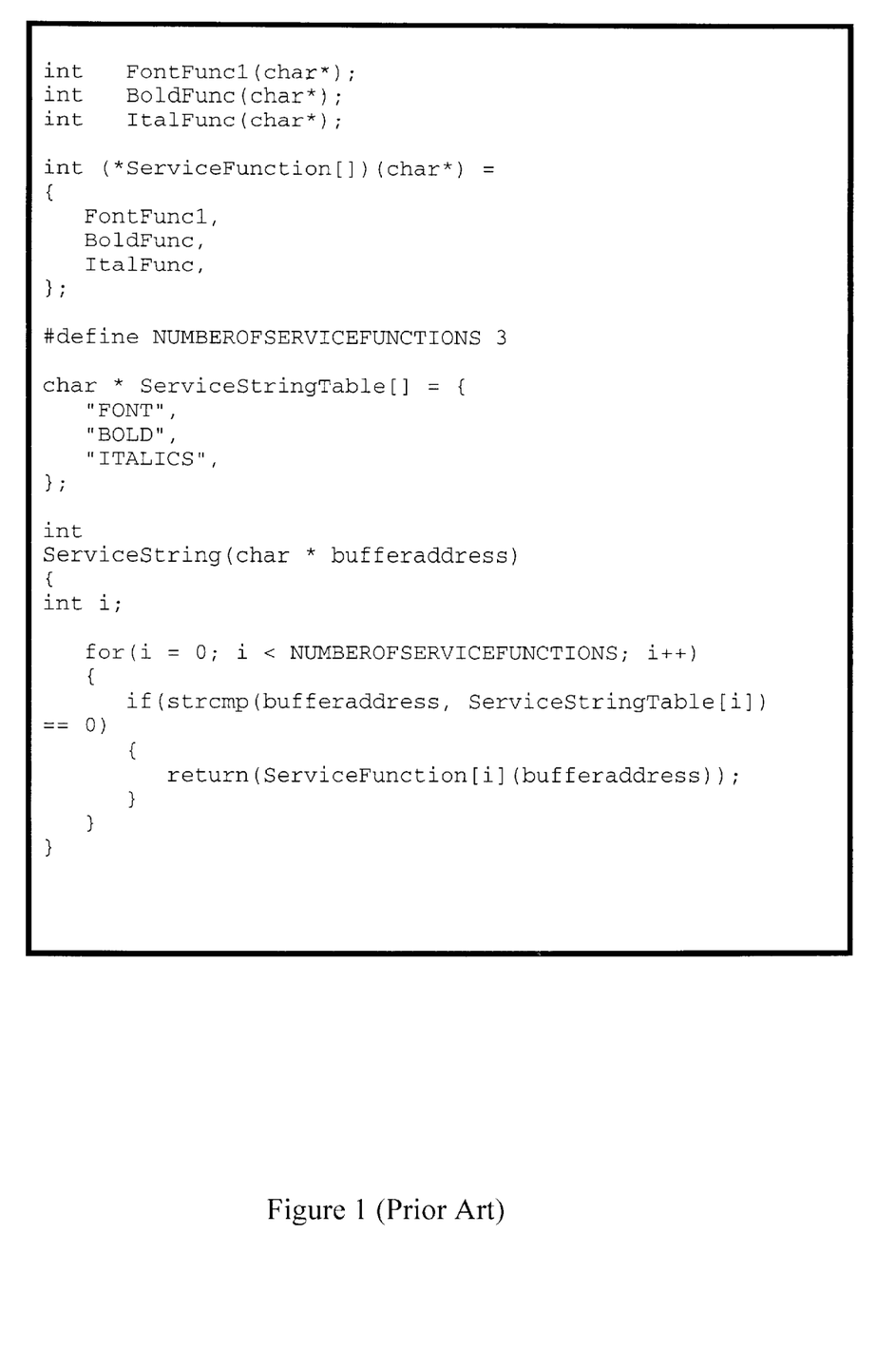
FIG. 1 is a fragment of source code illustrating a prior art approach for a parser.

Referring to FIG. 1 (Prior art) a code fragment rendered in the popular 'C' language shows a simple parse loop for a leading command in a text string utilizing the well-known strcmp( ) function. Whilst highly portable it is apparent to a practitioner in the art that this code (FIG. 1) will consume needlessly many MPU clock cycles when executed. Still referring to FIG. 1, re-implementing strcmp( ) as an in-line function may reduce the number of clock cycles to execute, but may produce startling performance variations across platforms and indeed across compilers. Although this code may exploit MPU optimization features including pipelining, branch prediction and data and instruction caching, the scope for exploiting other features such as out of order instruction execution, wide memory access and loop unrolling is limited. Moreover, there are simply too many instruction executions per iteration (even if the loop were unrolled).

Figure 2:
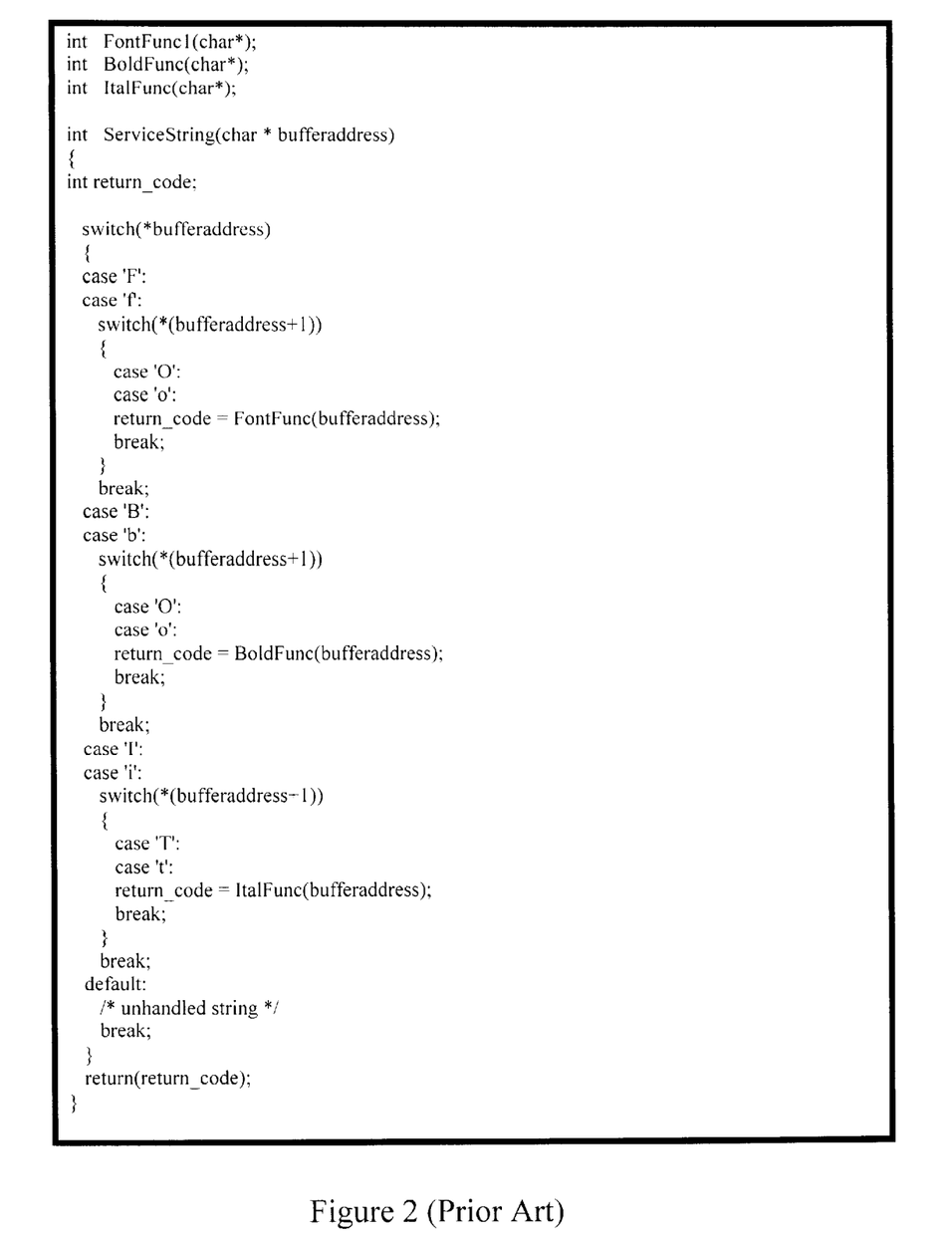
FIG. 2 is a fragment of source code illustrating another prior art approach for a parser.

Another approach is illustrated in FIG. 2 (prior art). This involves nested parsing of single characters from the string. Although less tidy in source, and perhaps still quite portable this approach also produces disappointing average execution times for the parsing of rich and complex command and/or markup languages. In addition, this type of code can be expensive and tedious to maintain or enhance.

Thus a need exists for a method and apparatus to improve efficiency in character oriented protocol interpreters as typified by HTML interpreters. Preferably, such an improved interpreter should be implemented in a manner that exploits the characteristics of modern MPUs as catered for in various optimizing high-level language compilers and in a manner that provides for a good measure of platform independence.

SUMMARY OF THE INVENTION

Accordingly, the present invention provides a method and apparatus to improve efficiency in character oriented protocol interpreters, whilst providing a good measure of platform independence.

Embodiments of the invention parse data protocol streams and according to the data content therein, conditionally cause execution of instruction codes constituting corresponding service routines.

In one embodiment of the invention, there is provision for compiling a function IBM of a sub-string from a byte oriented protocol stream into on-chip scratchpad memory and performing multiple (many or very many) word-oriented comparisons therefrom, This can take any of a number of forms. For example: four bytes of the string may be converted to a 32-bit integer by scaling each byte in turn, so that the bit patterns in the four bytes are orthogonal in the intermediate 32-bit result code. Alternatively, 64-bit integer may be preferred to hold the result if that were a favored word size in a CPU architecture. However, in the interests of portability it may be a better compromise to use a data type that is bound to the optimal precision at compile time, for example a "long int" in the popular 'C' language.

In another embodiment of the invention, there is provision for a small, but nonetheless useful, pre-parsing of the data stream. In this embodiment, bytes are compiled into words until a terminating character code is encountered, a maximum string length is reached, or some combination of such conditions occurs. Again this embodiment may be both portable across disparate architectures whilst retaining high efficiency in terms of MPU clock cycles.

All the features and advantages of the present invention will become apparent from the following detailed description of its preferred embodiment whose description should be taken in conjunction with the accompanying drawings.

DETAILED DESCRIPTION OF AN EMBODIMENT OF THE INVENTION

In the following detailed description of the present invention, specific details are set forth in order to provide a thorough understanding of the present invention. However, it will be obvious to one skilled in the art that the present invention may be practiced without these specific details. In other instances well known methods, procedures, or components have not been described in detail as not to unnecessarily obscure aspects of the present invention. It is to be appreciated that although the description relates to a firmware embodiment, the invention may also be practiced using software, programmable logic arrays, custom LSI and other techniques established in the computing arts.

Figure 3:
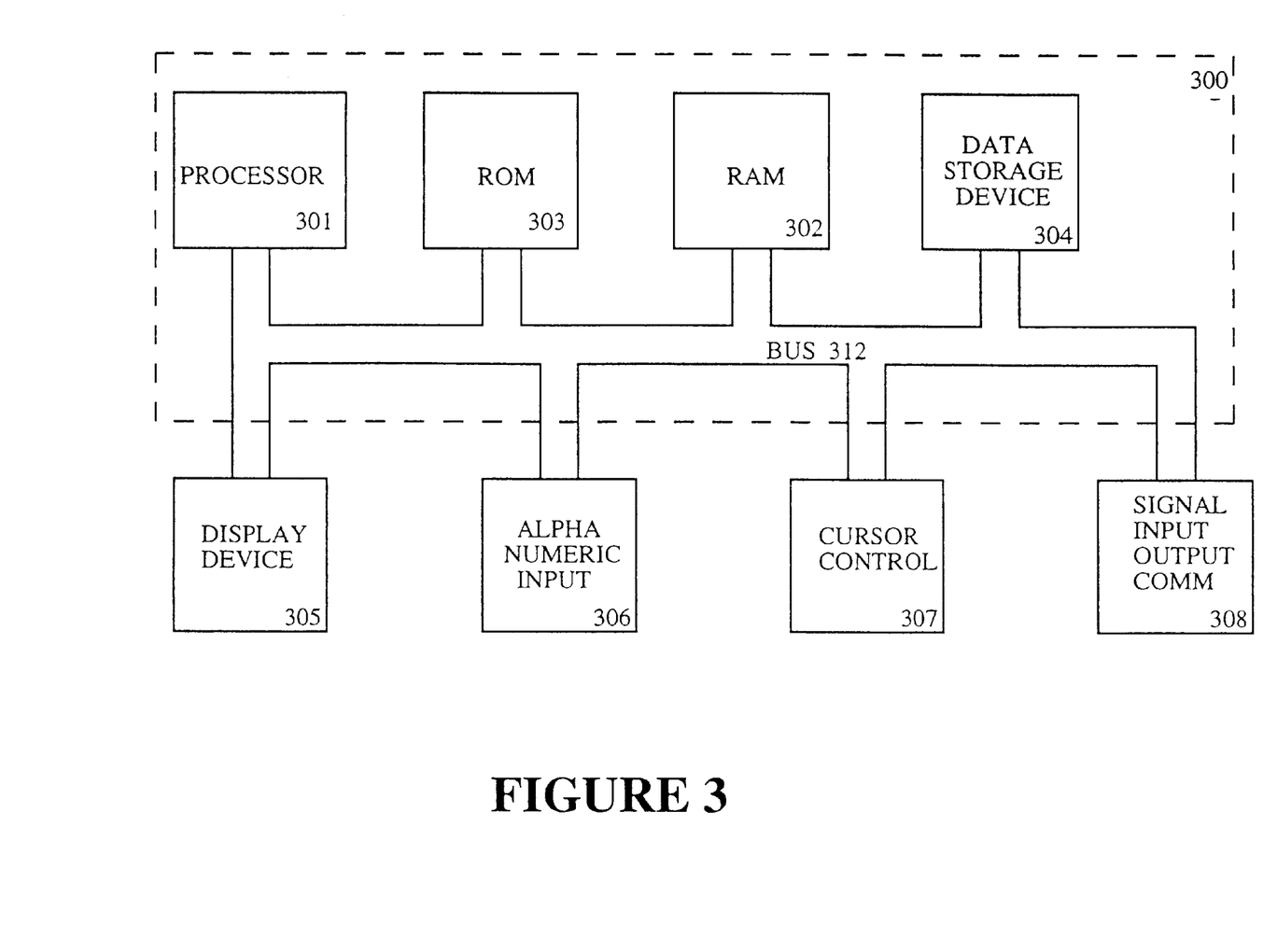
FIG. 3 illustrates a typical computer used to implement software or firmware including a parser in accordance with the present invention.

Reference is made to FIG. 3 illustrating a block diagram of a typical embedded computer system 300 upon which the present invention may be implemented or practiced. Embedded computer system 300 is connected to a data network in a conventional manner (many connection modes are well known in the relevant arts). It is to be appreciated that embedded computer system 300 is exemplary only and that the present invention can operate within a number of different computer systems including general-purpose computers systems, personal computer workstations, and others. In the following discussions of the present invention, certain processes and steps are realized as a series of instructions (e.g., firmware program) that reside within computer readable memory units of system 300 and executed by processors of system 300.

In general, embedded computer system 300 used by the present invention comprises:

address/data bus 312 for conveying information and instructions, micro-processor (MPU) 301 coupled with bus 312 for processing information and instructions, the MPU comprises Arithmetic and Logical Units, memory caches, registers and scratchpads as are known in the art.

a random access memory (RAM) 302 for storing digital information and transitory instructions, a read-only memory (ROM) 303 for storing information and instructions of a more permanent nature.

In addition, embedded computer system 300 may also include:

a data storage device 304 (e.g., a magnetic, optical, floppy, or tape drive) for storing large amounts of data, and an Input/Output communicating interface 308 for interfacing with peripheral devices (e.g., computer network, modem, etc.).

More particularly, the memories (e.g., RAM 302, ROM 303, and data storage device 304 (if present)) of embedded computer 300 typically store embedded system firmware as well as the embedded system instruction codes in accordance with the present invention. A person of ordinary skill in the art will understand that the memories may also contain additional information such as applications programs, network communication programs (e.g., TCP/IP protocol), diagnostic firmware, data, etc.

Moreover, embedded computer system 300 may typically, but need not, include:

a display device 305 for displaying information to a computer user, an alphanumeric input device 306 (e.g., keyboard), and a cursor control device 307 (e.g., mouse, track-ball, light-pen, etc.) for communicating user input information and command selections.

Reference is now made to FIGS. 4 and 5A, 5B, 5C illustrating the computer-implemented steps to carry out an embodiment of the parser mechanism in accordance with the present invention. In general, the steps in FIGS. 4 and 5A, 5B, 5C are designed to implement the mechanism discussed above. The steps in FIGS. 4 and 5A, 5B, 5C are carried out when processor 301 executes the instruction codes stored in memory of embedded computer system 300. It is to be appreciated that the steps described (infra) are illustrative only and other sequences of steps could be used within the general scope of the invention.

Figure 4:
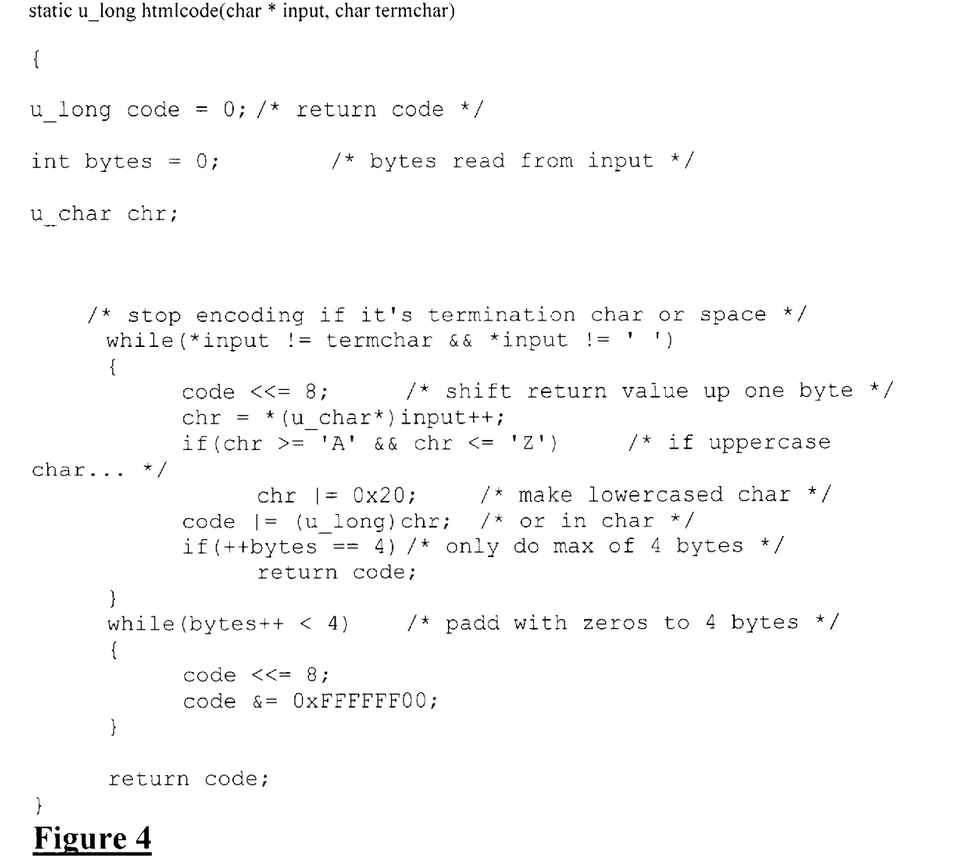
FIG. 4 is a fragment of source code illustrating a pre-parser in accordance with the present invention.

Reference is now made to FIG. 4 illustrating sample 'C' language source code that represents part of the computer implemented program used to carry out the preferred embodiment of the firmware protocol pre-parser in accordance with the present invention.

Still referring to FIG. 4, a programmed function called htmlcode is defined. The htmlcode programmed function is a function for a small pre-parsing of the data stream. As is apparent from the Figure, to one versed in the 'C' language programming art, that the function behaves as described (infra). The htmlcode function parses a string specified by a reference address and terminated by the first occurrence of: (a) a terminating space byte, or (b) a terminating matching byte value (passed as parameter 'termchar'), or (c) a maximum string length of four bytes. For each possible sub-string value an unique unsigned long integer (at least 32 bits) is generated and set as the return value, except that upper and lower case letters from the roman alphabet are intentionally set mutually equivalent. As is apparent to one of skill in the 'C' language art, htmlcode is a very fast function in execution.

Figure 5C:
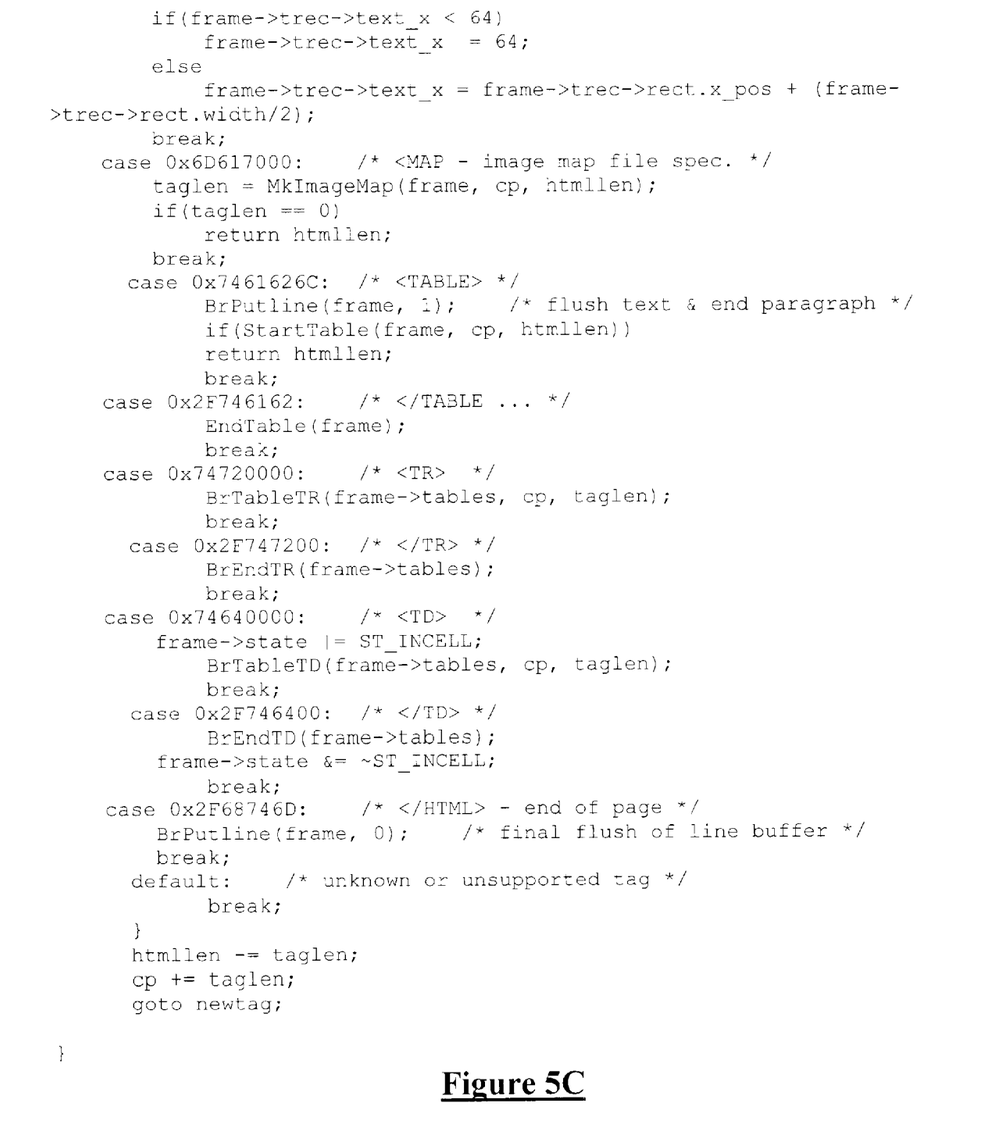
FIG. 5 is a fragment of source code illustrating a parser and service routine invocation in accordance with the present invention.

Referring now to FIGS. 5A, 5B, 5C (collectively FIG. 5). The program code 307 fragment shows a parser for an HTML tag (a well-known family of substring commands introduced by fixed opening character being the character represented by the ASCII 'less-than' character). ASCII strictly refers to the American Standard Code for Information Interchange, or more loosely to any of the families of codes defined by International Alphabet No. 8 as promulgated by ISO (the International Standards Organisation - a United Nations agency).

Still referring to FIG. 5, on entry the character pointer op points to the HTML tag opening byte ('<'), and a check is made, using the well-known strchr built-in function that the HTML command sub-string is correctly delimited within proper bounds. This latter step also effectively produces the substring length (referred to as 'tagle').

Still referring to FIG. 5, next the 'htmlcode' function (discussed supra) is invoked in order to produce a 32-bit code (referred to using the identifier name 'code') that uniquely represents the HTML command (in most, but not all cases).

Thereafter a switch-case mechanism is employed to provide simple and swift invocation of action routines in response to the 32-bit code, which in turn depends upon the HTML command in the substring.

Still referring to FIG. 5, dropping out of the switch-code block upon completion of the corresponding supporting action routine allows update of byte counter (htmllen) and string pointer (cp) so that further parsing of the incoming data stream may continue (at 'newtag' (not shown)).

Though deceptively simple, this overall procedure of generating an unique code of the MPU's natural word size and switching therefrom contributes to the achievement of the desired aims that were alluded to supra.

It will be appreciated that FIGS. 4 and 5A, 5B, 5C together represent but a collection of program code fragments. However the surrounding framework of codes required is old and known to programmers of ordinary skill in the relevant arts and that are familiar with programmed embodiments of parsers in general.

Although all of the steps above are desirable in the present embodiment, it is clear to a person of ordinary skill in the art that some steps may be omitted during implementation and still be within the scope of the invention.

An improved protocol parser for embedded systems is described supra. While the present invention has been described in particular embodiments, the present invention should not be construed as limited by such embodiments, but rather construed according to the below claims.

What is claimed is:

1. A method to parse a byte oriented data stream according to a protocol, the method comprising the steps of:
   (a) calculating a first value resulting from scaling a first byte selected from the data stream by a first integer power of 2, wherein the first value may be represented within 32 bits;
   (b) calculating a second value by scaling a second byte selected from the data stream by a second integer power of 2 and summing with the first value, wherein the second value may be represented within 32 bits;
   (c) calculating a third value by scaling a third byte selected from the data stream by a third integer power of 2 and summing with the second value, wherein the third value may be represented within 32 bits;
   (d) calculating a fourth value by scaling a fourth byte selected from the data stream by a fourth integer power of 2 and summing with the third value, wherein the fourth value may be represented within 32 bits;
   (e) providing a plurality of keys, each member of the plurality having a size of at least 32 bits;
   (f) selecting a key from the plurality of keys;
   (g) conditionally invoking a service routine selected from a plurality of service routines depending upon the fourth value and further depending upon the selected key and
   (h) repeating steps (e), (f), (g), until a test is satisfied, the test being selected from a list consisting of the service routine having been invoked and a defined number of members of the plurality of keys having been selected.

2. The method as in claim 1 wherein the first integer, second integer, third integer and fourth integer are each zero or multiples of 8.

3. The method as in claim 1 wherein the first integer, second integer, third integer and fourth integer are each mutually unequal.

4. The method as in claim 2 wherein the first integer, second integer, third integer and fourth integer are each mutually unequal.

5. A server coupled to a client-server network supporting a uniform hypertextual protocol, the server comprising:
   a system bus;
   a processor connected to the bus;
   memory connected to the bus; and
   a data communications device coupled between the bus and the communications network; wherein the memory storing instruction codes, the instruction codes when executed by the processor performing the following steps:
   (a) calculating a first value resulting from scaling a first byte selected from the data stream by a first integer power of 2, wherein the first value may be represented within 32 bits;
   (b) calculating a second value by scaling a second byte selected from the data stream by a second integer power of 2 and summing with the first value, wherein the second value may be represented within 32 bits;

(c) calculating a third value by scaling a third byte selected from the data stream by a third integer power of 2 and summing with the second value, wherein the third value may be represented within 32 bits;

(d) calculating a fourth value by scaling a fourth byte selected from the data stream by a fourth integer power of 2 and summing with the third value, wherein the fourth value may be represented within 32 bits;

(e) providing a plurality of keys, each member of the plurality having a size of at least 32 bits;

(f) selecting a key from the plurality of keys;

(g) conditionally invoking a service routine selected from a plurality of service routines depending upon the fourth value and further depending upon the selected key and (h) repeating steps (e), (f), (g), until a test is satisfied, the test being selected from a list consisting of the service routine having been invoked and a defined number of members of the plurality of keys having been selected.

* * * * *